June 5, 1962     J. A. ARNAULT     3,037,760
SHAPE CUTTING MACHINE-REMOTE TRACING SYSTEM
Filed March 30, 1959
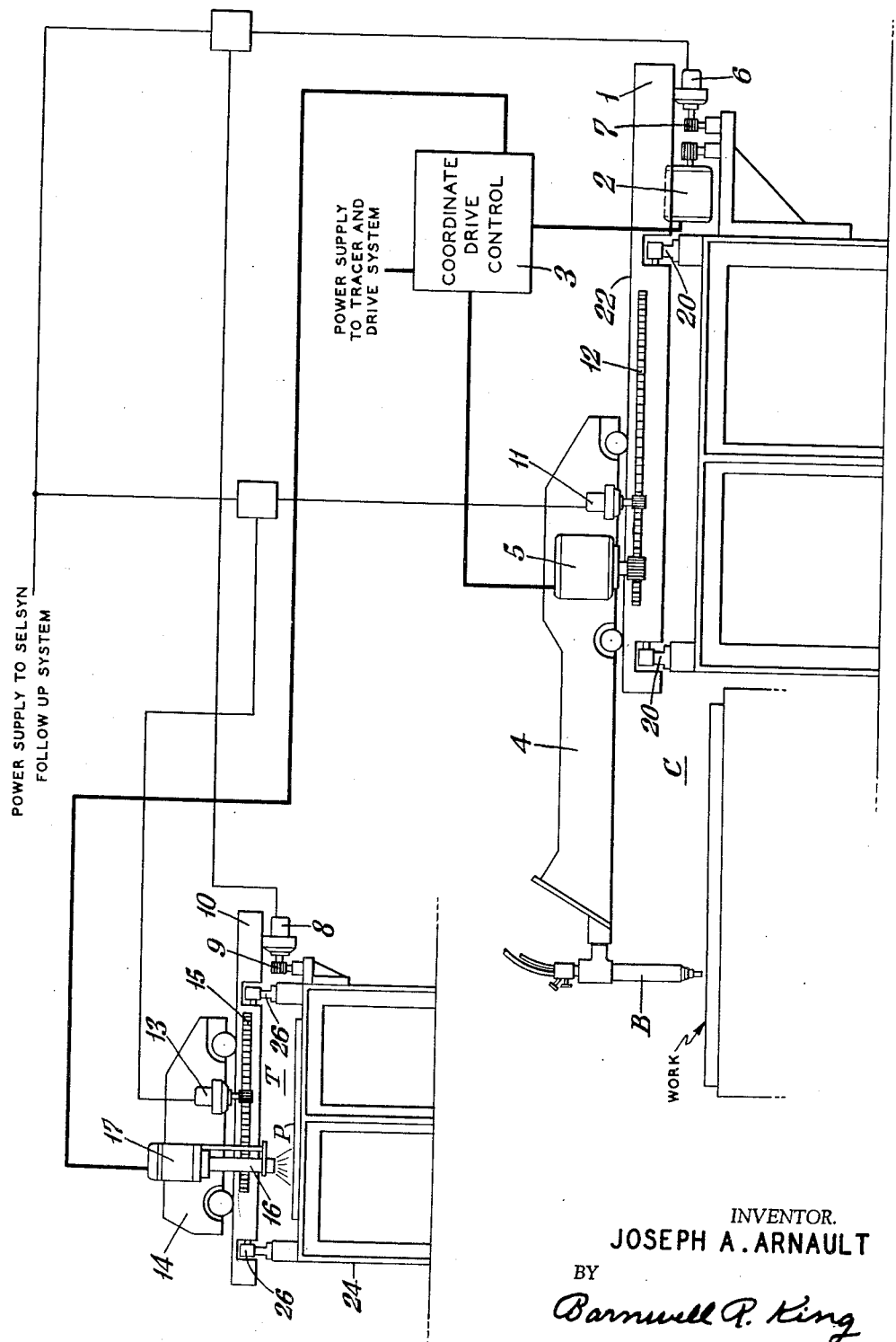
INVENTOR.
JOSEPH A. ARNAULT
BY
Barnwell P. King
ATTORNEY

United States Patent Office 3,037,760
Patented June 5, 1962

3,037,760
SHAPE CUTTING MACHINE-REMOTE
TRACING SYSTEM
Joseph A. Arnault, Fanwood, N.J., assignor to Union
Carbide Corporation, a corporation of New York
Filed Mar. 30, 1959, Ser. No. 802,835
4 Claims. (Cl. 266—23)

This invention relates to shape cutting machines and, more particularly, to a remote tracing system therefor.

The invention provides a shape cutting machine remote-control system comprising the combination with a tracing machine including a tracer, and at least one cutting machine including a cutter remotely located with respect to said tracer, of electrical control means acting to steer the cutter of said cutting machine in accordance with a selected path followed by the tracer of said tracing machine, and means synchronizing the movement of such tracer with such cutter comprising a selsyn motor driving said tracer, a selsyn generator driven by said cutter, and means electrically interconnecting said selsyn generator with said selsyn motor for keeping the movement of the tracer in exact relative synchronism with the movement of the cutter as the cutter is remotely steered by the tracer through such electrical control means.

The invention also provides a method of cutting shapes which comprises moving a tracer along a trace path corresponding to the outline of the shape to be cut, steering with such tracer a cutter remotely located with respect to such tracer along a cutting path corresponding to such outline and electromechanically synchronizing relative movement of such tracer with such cutter by generating electrical synchronizing signals in response to such movement of the cutter, and controlling the movement of such tracer with the so-generated signals, whereby relative movement of a tracer is electrically interlocked with that of the cutter.

In most prior conventional contour reproducing cutting machines, the cutting torch and the tracing unit were mounted on the same movable member, either the upper carriage of a dual carriage machine or the transverse bar of the swinging arms on a pantograph type machine.

Such arrangements have two distinct disadvantages: (1) the tracing unit is not capable of being remotely located with respect to the cutting machine proper; and (2) it is not possible without prohibitively complicated mechanisms to cause the cutter such as a blowpipe to travel through a path of a different size ratio, such as 10 to 1, than the path of the tracing head.

Were it possible for the tracing unit to be located remotely with respect to the cutting machine, the tracing unit could then be placed in a clean, protected area, conducive to best operating and maintenance care.

Also, particularly for cutting extremely large plates (such as those used in shipbuilding, etc.), there would be advantages in using a template of much smaller size than the workpiece. For example, a template made to $\frac{1}{10}$ size of the finished workpiece would be easier to make and to handle than a full size template and the area required for the tracing operation could be considerably reduced, effecting a saving in floor space.

Conversely, when cutting very small workpieces employing a larger size template, such as double size, would result in a reduction of tracing errors, thus producing more accurately formed work. Also, with some tracing units, there is a minimum radius that can be traced on corners. If a double size template, for example, could be used, a radius of $\frac{1}{2}$ the amount permitted by the tracing unit could be achieved in the cutting blowpipe travel.

The remote tracing system disclosed in the Lobosco Patent No. 2,494,664 provides a system which overcomes these disadvantages. However, the Lobosco system has definite limitations, outlined below, which are overcome by the present invention. The Lobosco tracing system includes a remotely located tracing machine (master machine) to control the travel of the dual carriages of a cutting machine (follower machine) carrying the cutting torch. In such system, the carriages of the master tracing machine are self-driven and self-synchronous follower motors power the carriages of the follower cutting machine. Movement of the master tracer carriages powers self-synchronous generators, one of which is located on each of the master carriages, through a pinion and rack arrangement. Such self-synchronous generators control corresponding self-synchronous motors on the follower carriages. The corresponding carriages of the master and follower machines may be: (1) connected in 1 to 1 ratio so that both trace the same size contour; or (2) connected through a suitable speed changing device such that the follower carriages are caused to trace a contour in some other predetermined ratio with respect to the contour traced by the master carriages.

In the Lobosco system since the tracing unit traces and travels independently of the follower machine, it has no means of knowing where the follower machine carriages actually go. That is, there is no reflection to the tracing unit of the true position and/or any error which may occur in the actual position of the follower machine. Therefore, it is possible for the follower machine carriages to deviate from the desired path of travel without causing any corrective action at the tracing machine. Such deviations on the part of the follower machine carriages may be caused by any of a number of conditions, such as overrun at corners, inertia effects, friction in the follower carriage members, both time and position lag in the response of the self-synchronous motors to signals from the self-synchronous generators, etc. For example, the cutting machine, in order to permit cutting of large workpieces and the carrying of the torch or multiple torch loads accurately and without vibration, usually needs to be quite large and of heavy, rigid construction. Therefore, it is necessary for the self-synchronous motors to supply substantial torque to move the cutting machine carriages. To obtain this required torque from the self-synchronous generators without unduly loading the master tracing machine drive, it is necessary to employ amplifying systems between the self-synchronous generators and their respective self-synchronous motors. The more torque required, the more elaborate the amplifying system must be to overcome the tendency of the self-synchronous motors to lag the self-synchronous generators. Even a few degrees of lag will affect the accuracy of the response of the follower carriages.

When operating on a small template, such as, for example, one-tenth size, a small travel distance of one of the tracing machine carriages must cause a substantially greater travel of the corresponding cutting machine carriage. Therefore, the amplifying system has that much more work to do and a small amount of lag in the synchro system represents a much larger degree of error (about ten-fold for this example) in the response of the cutting torch position relative to the tracing unit position.

Thus, it may be seen, that such deviations on the part of the follower cutting machine carriages, without corresponding corrective action on the part of the tracing unit, are extremely undesirable where accurately cut workpieces are required.

It is, therefore, a primary object of this invention to provide a remote tracing system which incorporates a means of supplying corrective action on the part of the tracing unit such that the extent of the deviation or error is closely limited by applying a corrective force as soon as the error or deviation starts to occur and the cutting machine is caused to rapidly return to the desired line of travel corresponding to the template outline.

A further object is to eliminate the need for transmitting, through the synchro system, the large amount of torque required to move the relatively heavy cutting machine carriages.

Basically, the above stated objects are accomplished according to the invention by: (1) employing self-powered dual carriages on the cutting machine; (2) controlling the path of travel of the torch carrying member by a tracing unit located on a remote dual carriage tracing machine; and (3) having the corresponding carriages of the tracing machine and cutting machine electrically interconnected so that movement of the tracing machine carriages follows the movement of the cutting machine carriages with the result that the tracing unit is carried in a path corresponding to the travel path of the torch carrying member on the cutting machine. Thus, any deviation from the desired cutting path is immediately sensed by the tracing unit and the proper corrective action taken. This is achieved in the preferred form of the invention by locating a coordinate drive system, such as that of the W. L. Martin patent application, Serial No. 677,599, on the cutting machine and locating the sine-cosine generator, used in the Martin system to control the cutting machine drive, remotely on the tracing machine. An automatic tracer, such as a photocell tracer, is used to "steer" the sine-cosine generator as the tracer follows the pattern. A combination of self-synchronous generators on the cutting machine carriages, electrically connected to self-synchronous motors on the carriages of the tracing machine, causes the tracing machine carriages to follow precisely the movements of the corresponding cutting machine carriages. Because the tracing machine carriages can be very light in comparison to the cutting machine carriages, the transmission of very little torque is required to move the tracing machine carriages.

This arrangement also readily lends itself to selected ratio cutting wherein the ratio of movement of the tracing machine carriages relative to the cutting machine carriages may be adjusted to any desired ratio by the use of suitable gears or screw feeds in the mechanical drive linkage between the cutting machine carriages and the self-synchronous generators and between the self-synchronous motors and the tracing machine carriages.

In the drawing:

The single FIGURE is a diagram illustrating a shape cutting machine-remote tracing system, exemplifying the invention, with some parts being shown in side elevation.

The preferred form of the invention may be more fully understood by referring to the drawing in which lower carriage 1 of a shape cutting machine C is driven in a longitudinal direction on horizontal tracks 20, 20 by a lower carriage drive motor 2, whose direction and speed are regulated by a coordinate drive control 3. Similarly, upper carriage 4 of the cutting machine is driven in a transverse direction on horizontal tracks 22 on lower carriage 1, by an upper carriage drive motor 5, whose speed and direction are also regulated by the coordinate drive control 3. A self-synchronous, i.e. selsyn generator 6, mounted on the lower carriage 1 is geared to a rack 7 on the cutting machine table frame 23 so that movement of the lower carriage 1 causes rotation of the self-synchronous generator shaft.

The self-synchronous generator 6 is electrically connected to a self-synchronous, i.e. selsyn motor 8 on the lower carriage 10 of a tracing machine T remotely located with respect to the cutting machine C, so that when the shaft of generator 6 is caused to rotate by movement of the lower carriage 1 of the cutting machine C, the shaft of motor 8 is caused to rotate correspondingly. A pinion of the shaft of motor 8 engages rack 9 on the tracer table frame 24 such that rotation of this shaft causes longitudinal movement of the tracing machine lower carriage 10. Thus, any movement of the cutting machine lower carriage is followed by corresponding movement of the tracing machine lower carriage.

Similarly, self-synchronous or selsyn generator 11, mounted on the upper carriage 4 of the cutting machine and engaging the rack 12 on the cutting machine lower carriage 1, is electrically connected to the self-synchronous or selsyn motor 13 which is mounted on the upper carriage 14 of the tracing machine and engages the rack 15 on the tracing machine lower carriage 10. Thus, movement of the cutting machine upper carriage 4 causes corresponding movement of the tracing machine upper carriage 14 in the transverse direction. The result is that wherever the cutting torch or blowpipe B on the cutting machine goes in a horizontal plane above work W mounted thereunder, the tracing unit 16 on the tracing machine follows, since carriage 14 travels on transverse-horizontal tracks 25 mounted on lower carriage 10 which travel on longitudinal-horizontal tracks 26, 26 mounted on the frame 24 of tracer T.

The tracing unit 16 may be of the photocell type or the stylus type. A photocell tracer, such as the Canadian Westinghouse Ltd. "Linatrol" tracer, or the tracing unit disclosed in the Cockrell Patent 2,261,644, is preferred. In this type of tracing unit, a steering motor aligns a shaft rotationally to correspond to the travel direction indicated by the momentarily existing relationship of the tracing unit 16 and a template pattern P supported horizontally under such unit which moves in a horizontal plane above such pattern. In conventional applications of such tracing units, a friction type drive wheel operating on the tracing surface is steered by the shaft of the tracing unit.

In the coordinate drive system preferred for this invention, the sine-cosine generator or resolver 17 is substituted for the friction drive wheel and its associated drive motor and gearing. The tracer unit points the direction of travel and the resolver 17 signals the required direction to the coordinate drive control 3 which regulates the speed and direction of the upper and lower carriage drive motors 5 and 2 of the cutting machine to produce the required cutting torch travel. As in the Martin coordinate drive system, the resultant cutting torch speed may be preset for any desired rate.

When the cutting machine operation is initiated, the cutting machine carriage drive motors cause the cutting torch B to travel in a horizontal plane at the desired travel speed as preset on the coordinate drive control 3. The direction in which the torch is carried is established by the directional orientation of the tracer unit 16 on the tracing machine as it aligns itself with the pattern P, and the tracing machine carriages are constrained to travel correspondingly to the cutting machine carriages. The tracing unit steers the cutting machine through the sine-cosine generator of the coordinate drive system so that the reflected travel of the tracing head remains aligned with the pattern and, if deviation should occur, tends to steer toward the pattern in such manner as to cancel out any errors.

In the preferred form of the invention, various ratios of travel distance between the cutting machine carriages and the tracing machine carriages are effected by the use of selected ratios of gear trains for coupling the self-synchronous generators 6 and 11 to the racks 7 and 12, respectively, on the cutting machine and the self-synchronous motors 8 and 13 to their respective racks 9 and 15 on the tracing machine. Use of change gears or of gear shift mechanisms provide means for changing over from one tracing ratio to another.

As is the case with all contour reproducing cutting machine operations, in order to accurately reproduce the pattern size in the cut piece size, without making dimensional allowance for the kerf width in the pattern itself, means must be provided in the remote tracing system of the invention for compensating for the width of the kerf produced by the cutting gas stream. Making allowance for the kerf width in the pattern requires the use of a different pattern size for each cutting nozzle size (material thickness). In order to eliminate the need for such a multiplicity of patterns, a kerf adjustment, such as disclosed in copending application Serial No. 765,085 or Serial No. 675,883, now abandoned, is preferably employed in conjunction with the photocell tracing unit. Such kerf adjustment has particular value in ratio cutting. For example, when using a pattern 1/10 the size of the desired cut piece, the dimensional adjustment on the pattern for a 1/8 inch kerf would be extremely difficult to make. With the kerf adjusting means built into the tracing unit as disclosed in the pending applications cited above, very fine micrometer adjustments can be made at the tracing head.

The method of the present invention includes the step of thermochemically cutting a kerf of predetermined width in a workpiece with such cutter in the shape of such outline, so that one side of such kerf corresponds exactly with such outline regardless of such kerf width; as well as the step of moving the tracer so that the path thereof of travel is laterally offset a predetermined adjustable distance with respect to a line on a drawing corresponding to such outline, which distance compensates for the width of such kerf.

Advantages of the remote tracing system of the invention as compared to one in which the cutting machine simply operates as a "follower" of a self-powered tracing machine are:

(1) Any deviation tendency of the cutting machine proper from the correct path of travel is reflected back to the tracing machine and detected as an error by the tracing head.

(2) It is necessary to transmit relatively little power through the drive arrangement between the cutting machine carriages and the tracing machine carriages because the tracing machine can be made relatively light and free-moving, because (*a*) It is not necessary for the tracing machine per se to carry cutting blowpipes extending out over the tracing area; (*b*) The tracing machine may be small compared to the cutting machine, working on reduced size templates on occasions when large shapes are to be cut; (*c*) When the tracing machine is operated on reduced size templates, a mechanical advantage is obtained due to step-down ratio in the drive transmitting system.

(3) Because of small power transmitted, there is minimum problem in making the slave carriage follow the master carriage without appreciable lag and without troublesome resilience effect.

To recapitulate, as applied to oxygen shape cutting machines, the invention incorporates two units, one of which involves the cutting torch being mounted on a movable member, either the upper carriage of a dual-carriage machine or on the transverse bar of the swinging arms of a pantograph type machine. The second unit, located remotely, incorporates a tracer which is adaptable to follow a template of reduced size, for example, in the ratio of 1 to 10.

In prior attempts to apply the dual unit arrangement there was inadequate synchronization between the units to insure accurate reproduction of the template contour. In the invention a remote tracing system incorporates means for automatically correcting such deviations of the torch from the true line. An additional important advantage is that relatively little power is required through the drive arrangement between the cutting machine carriages and the tracing machine carriages because the tracer unit can be made substantially lighter in weight and thus is easily movable.

What is claimed is:

1. A shape cutting machine remote-control system comprising the combination with a tracing machine including a tracer, and at least one cutting machine including a cutter remotely located with respect to said tracer, of electrical control means acting to steer the cutter of said cutting machine in accordance with a selected path followed by the tracer of said tracing machine, and means synchronizing the movement of such tracer with such cutter comprising a selsyn motor driving said tracer, a selsyn generator driven by said cutter, and means electrically interconnecting said selsyn generator with said selsyn motor for keeping the movement of the tracer in exact relative synchronism with the movement of the cutter as the cutter is remotely steered by the tracer through such electrical control means.

2. A shape cutting machine remote-control system as defined by claim 1, provided with adjustable means for selecting a predetermined fixed ratio between the travel of such cutter with respect to that of said tracer.

3. A shape cutting machine remote-control system as defined by claim 2, provided with transverse and longitudinal carriages associated with said cutting machine supporting a cutter comprising a work cutting torch for universal movement in a horizontal plane above a horizontally supported workpiece located under said torch for cutting such workpiece along a preselected path, and corresponding transverse and longitudinal carriages associated with said tracing machine supporting said tracer for universal movement in a horizontal plane above a horizontally supported pattern such as line drawing to be followed by such tracer, an automatic photocell tracing unit including a polar-coordinate resolver operatively associated with said tracer and said electrical control means for automatically steering said cutting torch, and generator and motor selsyns operatively associated with the corresponding carriages of both the tracing and cutting machines for keeping the movement of said tracer in exact synchronism with that of said cutter.

4. A shape cutting machine remote-control system as defined by claim 3, provided with kerf width compensating adjustment means operatively associated with said photocell tracing unit.

References Cited in the file of this patent
UNITED STATES PATENTS

| | | |
|---|---|---|
| 2,494,663 | Lobosco | Jan. 17, 1950 |
| 2,499,178 | Berry et al. | Feb. 28, 1950 |
| 2,679,620 | Berry | May 25, 1954 |
| 2,881,666 | Wetzel | Apr. 14, 1959 |

FOREIGN PATENTS

| | | |
|---|---|---|
| 1,049,494 | France | Dec. 30, 1953 |

OTHER REFERENCES

General Electric Review, June 1950, pages 44–47.